(12) United States Patent
Oehmann

(10) Patent No.: US 7,922,345 B2
(45) Date of Patent: Apr. 12, 2011

(54) REARVIEW MIRROR ASSEMBLY FOR A MOTOR VEHICLE WITH AN INTERIOR MOUNTABLE BRACKET

(75) Inventor: Roland Oehmann, Stuttgart (DE)

(73) Assignee: SMR Patents S.a.r.l., Luxembourg (LU)

( * ) Notice: Subject to any disclaimer, the term of this patent is extended or adjusted under 35 U.S.C. 154(b) by 305 days.

(21) Appl. No.: 10/561,352

(22) PCT Filed: Jun. 14, 2004

(86) PCT No.: PCT/DE2004/001222
§ 371 (c)(1),
(2), (4) Date: Feb. 15, 2007

(87) PCT Pub. No.: WO2004/113124
PCT Pub. Date: Dec. 29, 2004

(65) Prior Publication Data
US 2008/0030883 A1    Feb. 7, 2008

(30) Foreign Application Priority Data
Jun. 17, 2003   (DE) .................................. 103 27 180

(51) Int. Cl.
G02B 7/182    (2006.01)
(52) U.S. Cl. ....................................... 359/871; 248/473
(58) Field of Classification Search ................... 248/473, 248/475.1, 488; 359/871–874, 877
See application file for complete search history.

(56) References Cited

U.S. PATENT DOCUMENTS

| D452,671 S | 1/2002 | Lang |
| D581,333 S | 11/2008 | Courbon et al. |
| 2002/0080506 A1 * | 6/2002 | Lang et al. ..................... 359/879 |
| 2006/0087754 A1 * | 4/2006 | Blakeman et al. ............ 359/872 |

FOREIGN PATENT DOCUMENTS

| DE | 9410562.6 | 9/1994 |
| DE | 20106321 | 8/2001 |
| JP | 10181452 | 7/1998 |
| JP | 2001233130 | 8/2001 |
| JP | 2002337604 | 11/2002 |

* cited by examiner

Primary Examiner — Stephone B Allen
Assistant Examiner — Jennifer L. Doak
(74) Attorney, Agent, or Firm — Reising Ethington P.C.

(57) ABSTRACT

An outside rear view mirror assembly for a motor vehicle includes a mirror housing including a circumferential lateral wall defining an opening, an insertion opening and a back wall. The outside rear view mirror assembly also includes a mirror mounting bracket insertable into the mirror housing through the insertion opening. A snap-in tongue, defining a free end, extends out from the back wall for engaging the mirror mounting bracket when the mirror mounting bracket is inserted into the mirror housing to lock the mirror mounting bracket therein.

7 Claims, 14 Drawing Sheets

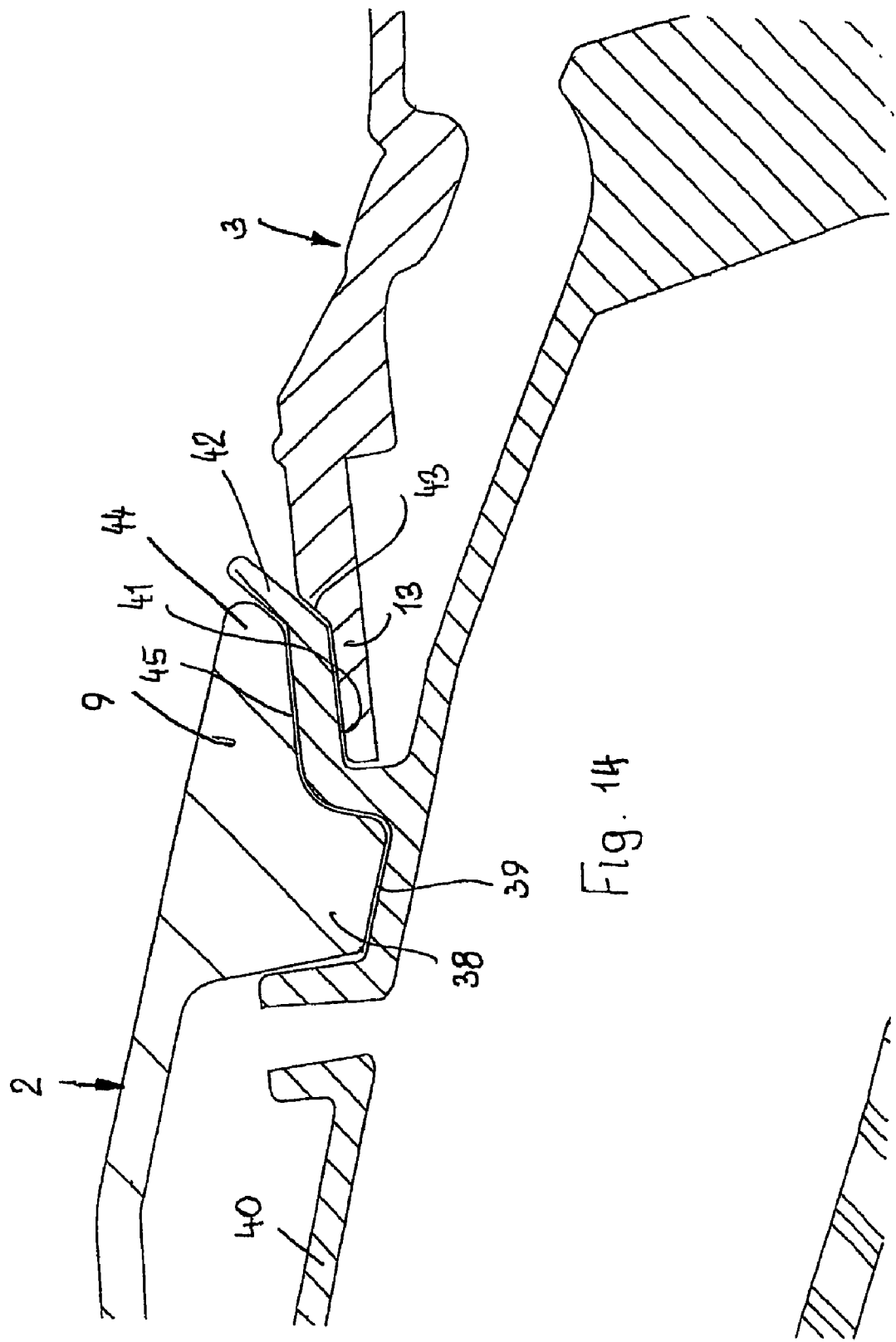

US 7,922,345 B2

REARVIEW MIRROR ASSEMBLY FOR A MOTOR VEHICLE WITH AN INTERIOR MOUNTABLE BRACKET

BACKGROUND ART

1. Field of the Invention

The invention related to outside rear view mirrors for motor vehicles. More particularly, the invention relates to outside rear view mirrors having a mirror mounting bracket that snap locks within a mirror housing thereof.

2. Description of the Related Art

In the case of outside rear view mirrors, it is known that mirror housings are joined with the mirror mounting bracket via a shaped plate spring. The manufacture of a shaped plate spring makes the outside rear view mirror more expensive and renders its assembly more difficult. In addition, use of the shaped plate spring increases the costs of the outside rear view mirrors due to increases in parts inventory and labor associated with assembling the outside rear view mirror.

SUMMARY OF THE INVENTION

An outside rear view mirror assembly for a motor vehicle includes a mirror housing including a circumferential lateral wall defining an opening, an insertion opening and a back wall. The outside rear view mirror assembly also includes a mirror mounting bracket insertable into the mirror housing through the insertion opening. A snap-in tongue, defining a free end, extends out from the back wall for engaging the mirror mounting bracket when the mirror mounting bracket is inserted into the mirror housing to lock the mirror mounting bracket therein.

BRIEF DESCRIPTION OF THE DRAWINGS

Advantages of the invention will be readily appreciated as the same becomes better understood by reference to the following detailed description when considered in connection with the accompanying drawings, wherein:

FIG. 14 is an enlarged cross-sectional view, partially cut away, of the locking area between the mirror mounting bracket and the mirror housing according to FIG. 12.

DETAILED DESCRIPTION OF THE PREFERRED EMBODIMENT(S)

The outside rear view mirror assembly for motor vehicles is generally indicated at 1. The outside rear view mirror assembly 1 is joined in a known manner to a mirror base plate (not represented) that is secured to the motor vehicle (not represented). The outside rear view mirror assembly 1 includes a mirror head, generally shown at 1a, which can be folded against the mirror base plate in or opposite the direction of travel of the motor vehicle. It is possible to mechanically adjust the mirror head 1a by means of a motor from the position of use to a position for parking in which the mirror head 1a will be located to the side of the motor vehicle. It is possible that the mirror head 1a can pivot against the mirror base plate in and opposite the direction of travel of the motor vehicle around one single upright axis. It is also possible to provide two separate upright pivoting axes for both pivoting directions of the mirror head 1a opposite the mirror base plate.

Figure 10:
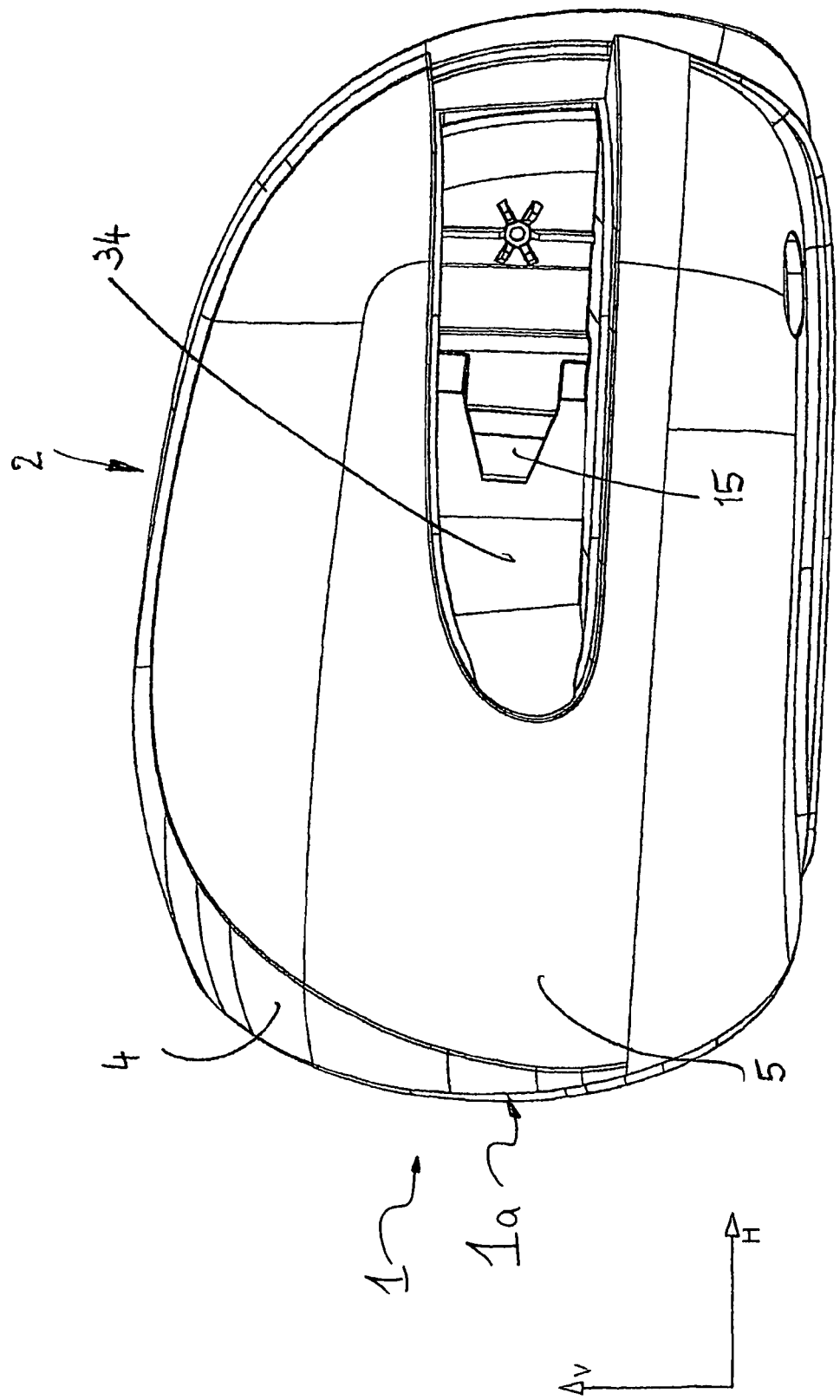
FIG. 10 is a rear view of the mirror housing according to FIG. 1.
Figure 11:
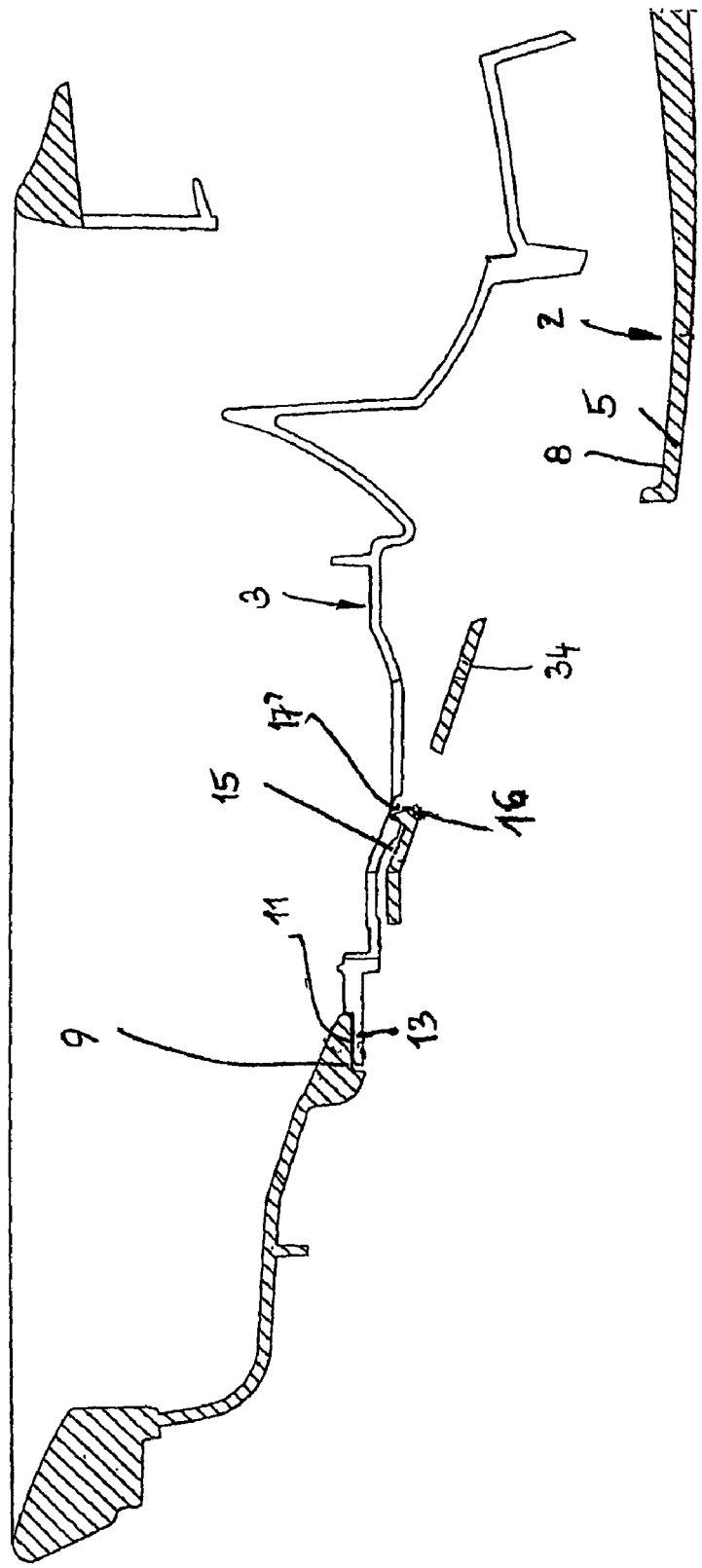
FIG. 11 is a cross-sectional view of the mirror head of the outside rear view mirror in accordance with the invention.

The mirror head 1 has a mirror housing 2 (FIGS. 1 and 10) and a mirror mounting bracket 3 which slides into the mirror housing 2. The mirror housing 2 has a circumferential lateral wall 4 which projects from a back wall 5 and which is advantageously designed as one piece together with the former. The lateral wall 4 defines an opening 6 in which a glass mirror (not represented) lies. The glass mirror is supported on the mirror mounting bracket 3. On the side facing the mirror base plate (not represented), the mirror housing 2 is open (FIG. 1) and defines an insertion opening 7. The mirror mounting bracket 3 can be inserted into the mirror housing 2 through the insertion opening 7. The back wall 5 of the mirror housing 2, which, in the installed position of the outside rear view mirror, faces forward in the travel direction of the vehicle, is convex when viewed from the direction of travel.

Figure 1:
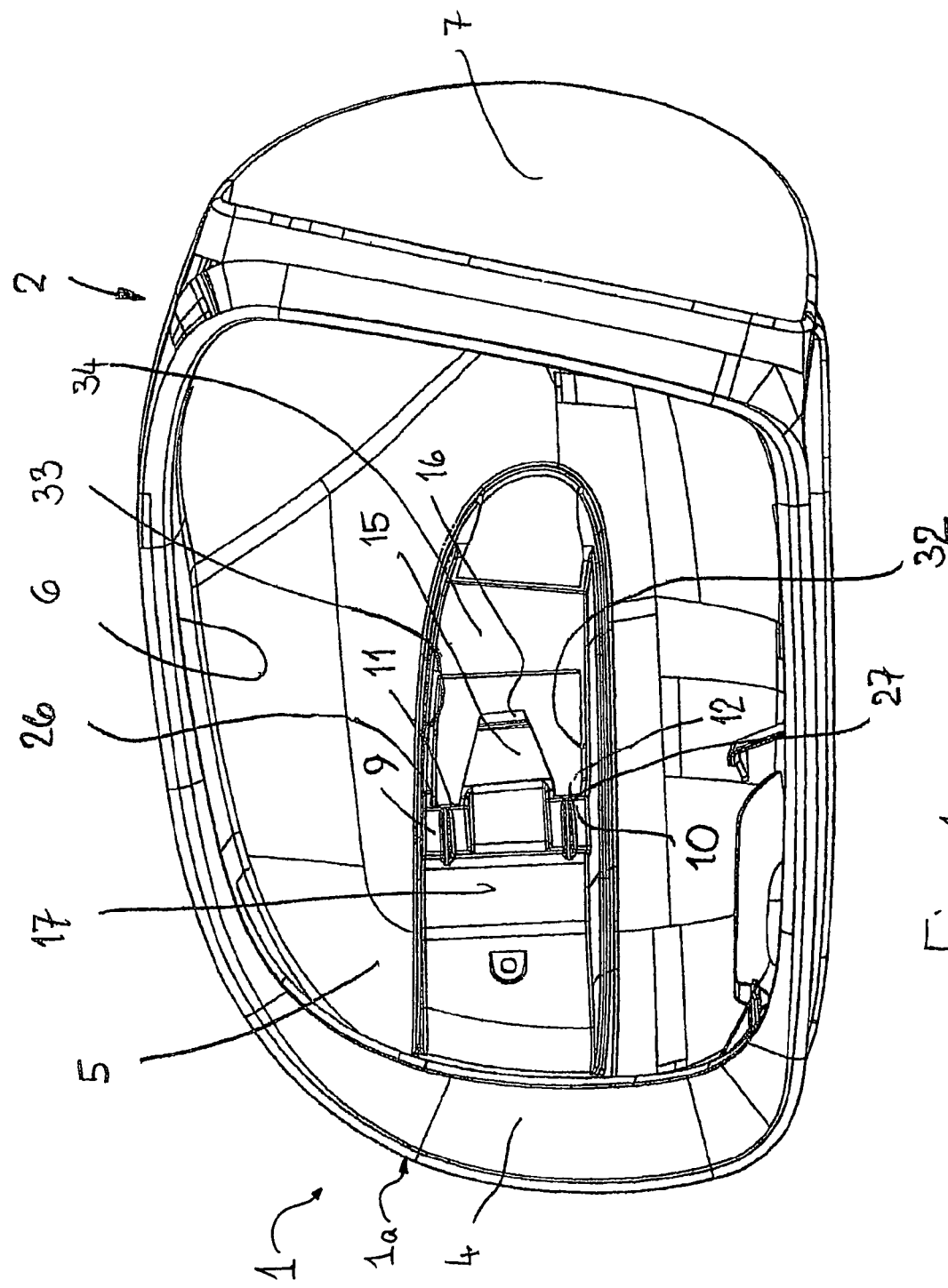
FIG. 1 is a front view of a mirror housing without mirror glass for an outside rear view mirror in accordance with the invention.
Figure 2:
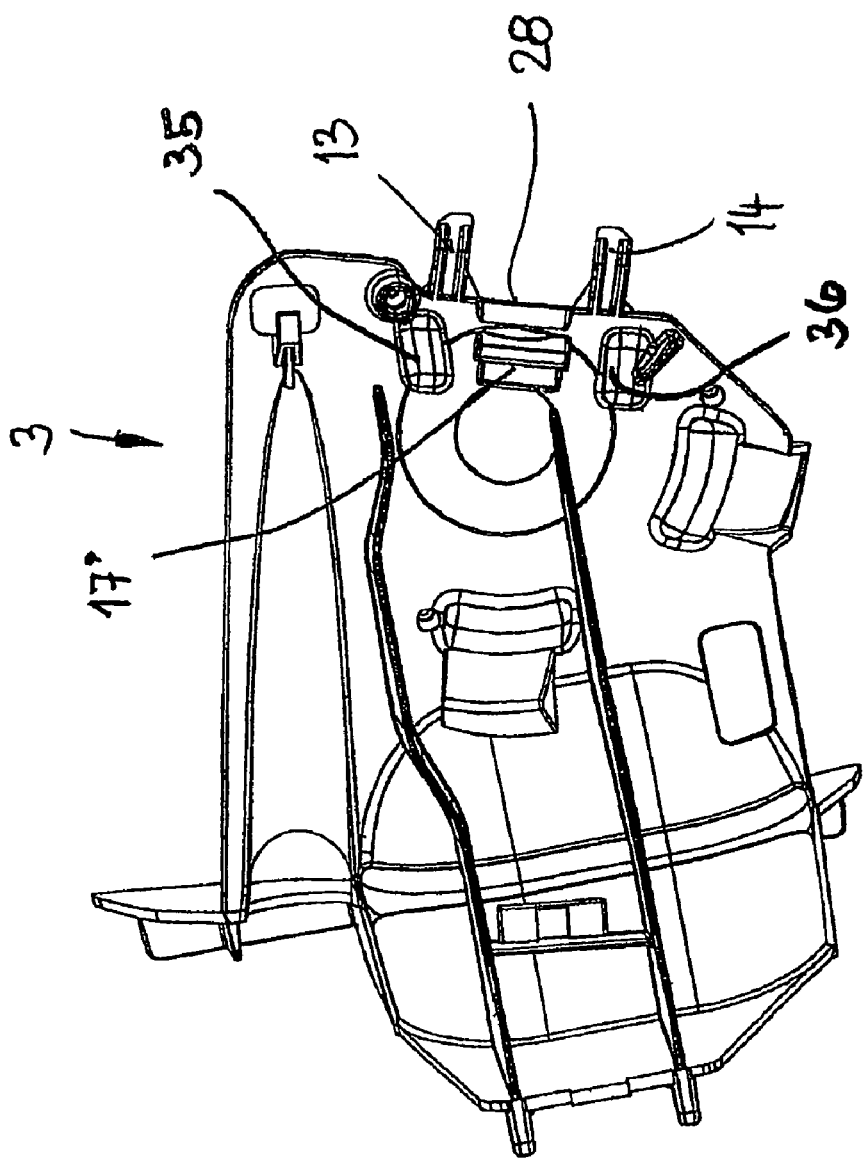
FIG. 2 is a back view of a mirror mounting bracket insertable into the mirror housing.

From an inner side 8 of the back wall 5, a wall section 17 stands out which is provided with two sectionally U-shaped profile sections 9 and 10 (FIGS. 1 and 6) which extend in the insertion direction of the mirror mounting bracket 3 and which respectively form an insertion tunnel 11 and 12 into which the mirror mounting bracket 3 engages with respectively one positive locking component 13, 14 in a manner yet to be described (FIG. 2). The two insertion tunnels 11, 12 are closed on their front ends in the insertion direction of the mirror mounting bracket 3. The profile sections 9, 10 are each advantageously designed as one piece together with the wall section 17 of the mirror head 1a.

In the area between the two profile sections 9, 10 lies a snap-in tongue 15 (FIG. 1) which is provided with a catch piece 16 on its free end. The snap-in tongue 15 engages into a catch recess 17' or catch opening (FIG. 7) of the mirror mounting bracket 3 and locks the mirror mounting bracket 3 in the mirror housing 2. The elastically springable formed snap-in tongue 15 is designed to freely collar/catch and tapers in the direction toward its free, distal end. As shown in FIG. 1, the width of the snap-in tongue 15 in the area of the profile sections 9, 10 more or less corresponds to the distance between the sections 9, 10.

The wall section 17 is internally inset opposite the inner side 8 of the back wall 5. It has a U-shaped sectional profile and lies at a distance from the inner side 8 of the back wall 5 as seen in the insertion direction of the mirror mounting bracket 3. The wall section 17 delimits a receiving chamber 18 (FIG. 6) for an additional light 19, that is, for example, the repeat flashing indicator light.

Figure 3:
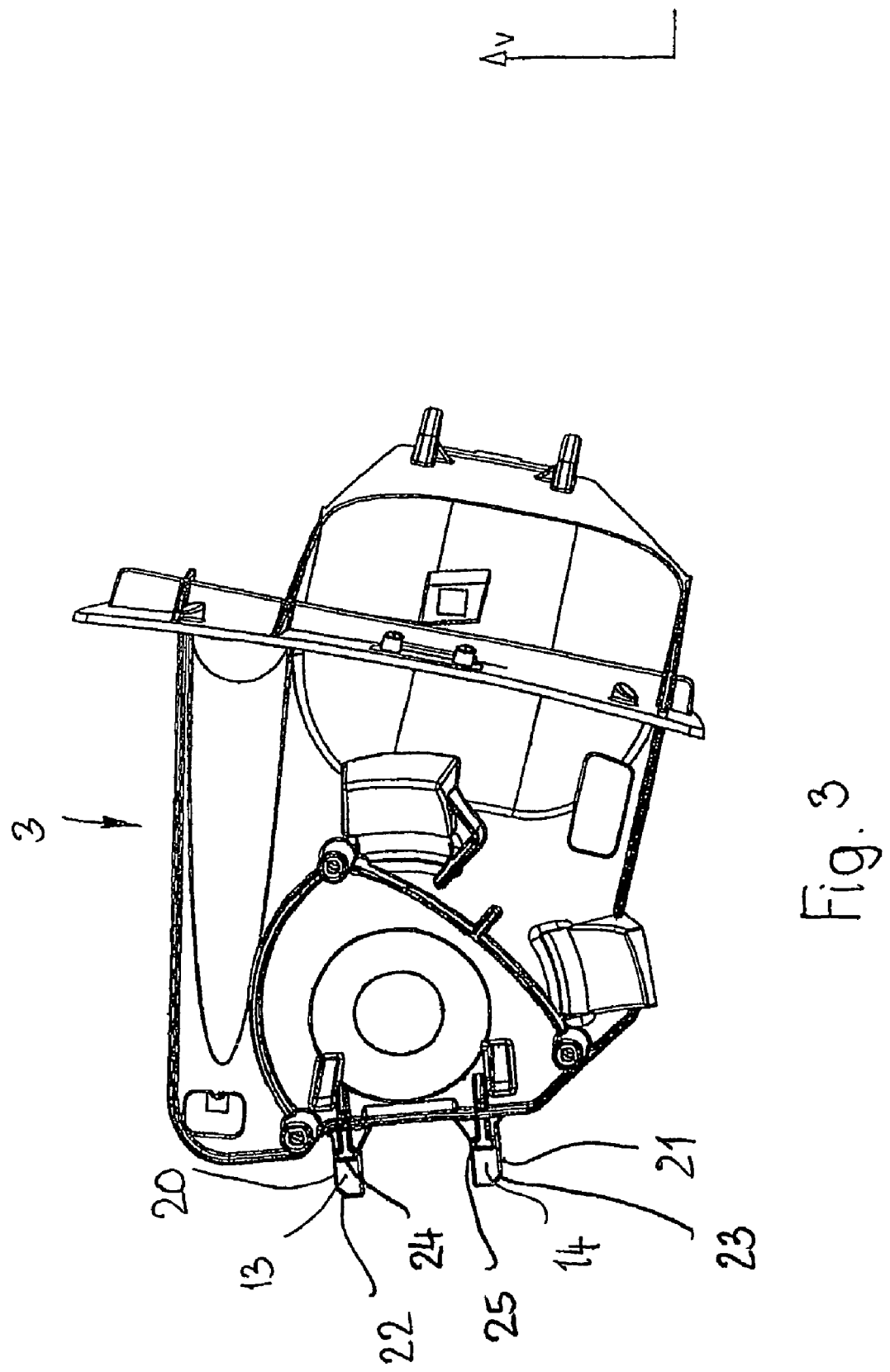
FIG. 3 is a front view of the mirror mounting bracket according to FIG. 2.
Figure 6:
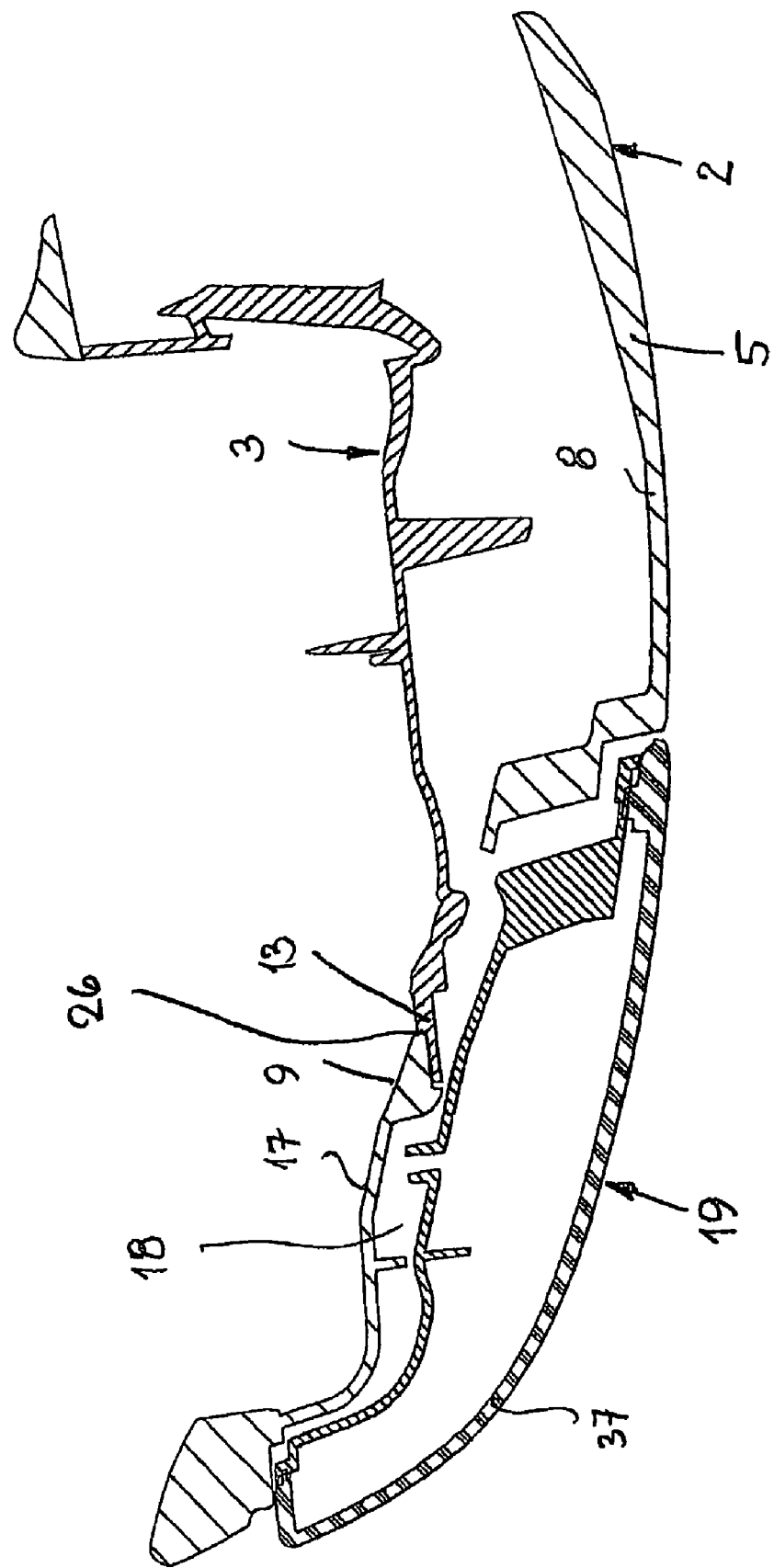
FIG. 6 is an enlarged representation of a section along lines A-A of FIG. 4.

The two positive locking components 13, 14 of the mirror mounting bracket 3 lie with a spacing between them and are parallel to one another. They are formed to be the same and project out past the mirror mounting bracket 3 (FIG. 3). The two positive locking components 13, 14 are respectively provided with a bevel 22, 23 on their longitudinal sides 20, 21 lying opposite one another in the direction of insertion. Owing to these bevels 22, 23 which run to converge in the direction of the free ends of the positive locking components 13, 14, a secure insertion of the positive locking components 13, 14 into the insertion components 11, 12 is ensured. On their one side, the positive locking components 13, 14 are provided with a stop 24, 25 which extends perpendicular to the longitudinal extension of the positive locking components 13, 14 and with which the positive locking components rest against a front face 26, 27 of the profile sections 9, 10 in the installed position. The stops 24, 25 are advantageously formed by a shoulder surface lying perpendicular to the upper side of the positive locking components 13, 14, as FIG. 6 shows for the positive locking component 13.

Figure 7:
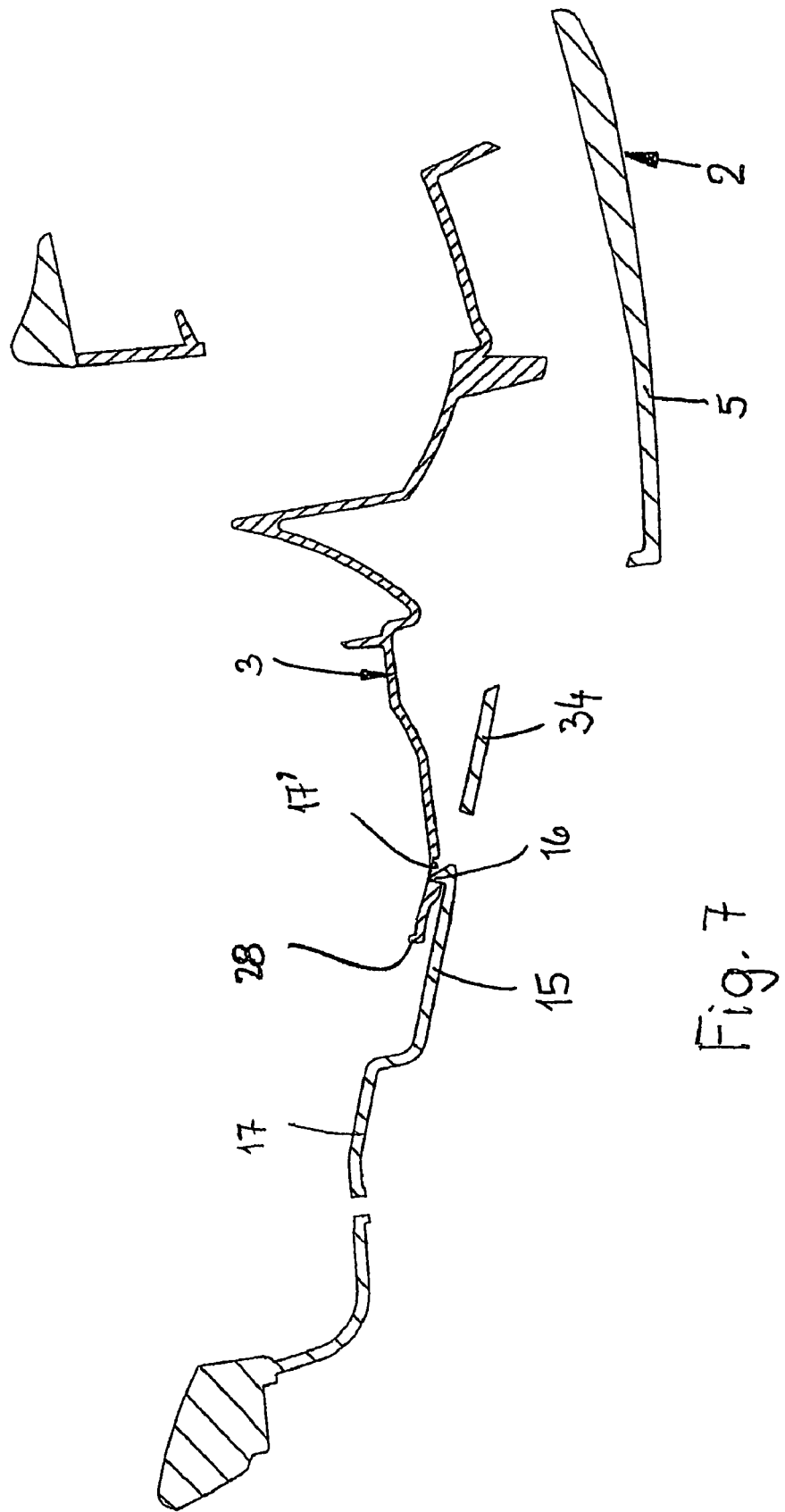
FIG. 7 is an enlarged representation of a section taken along lines B-B of FIG. 4.
Figure 8:
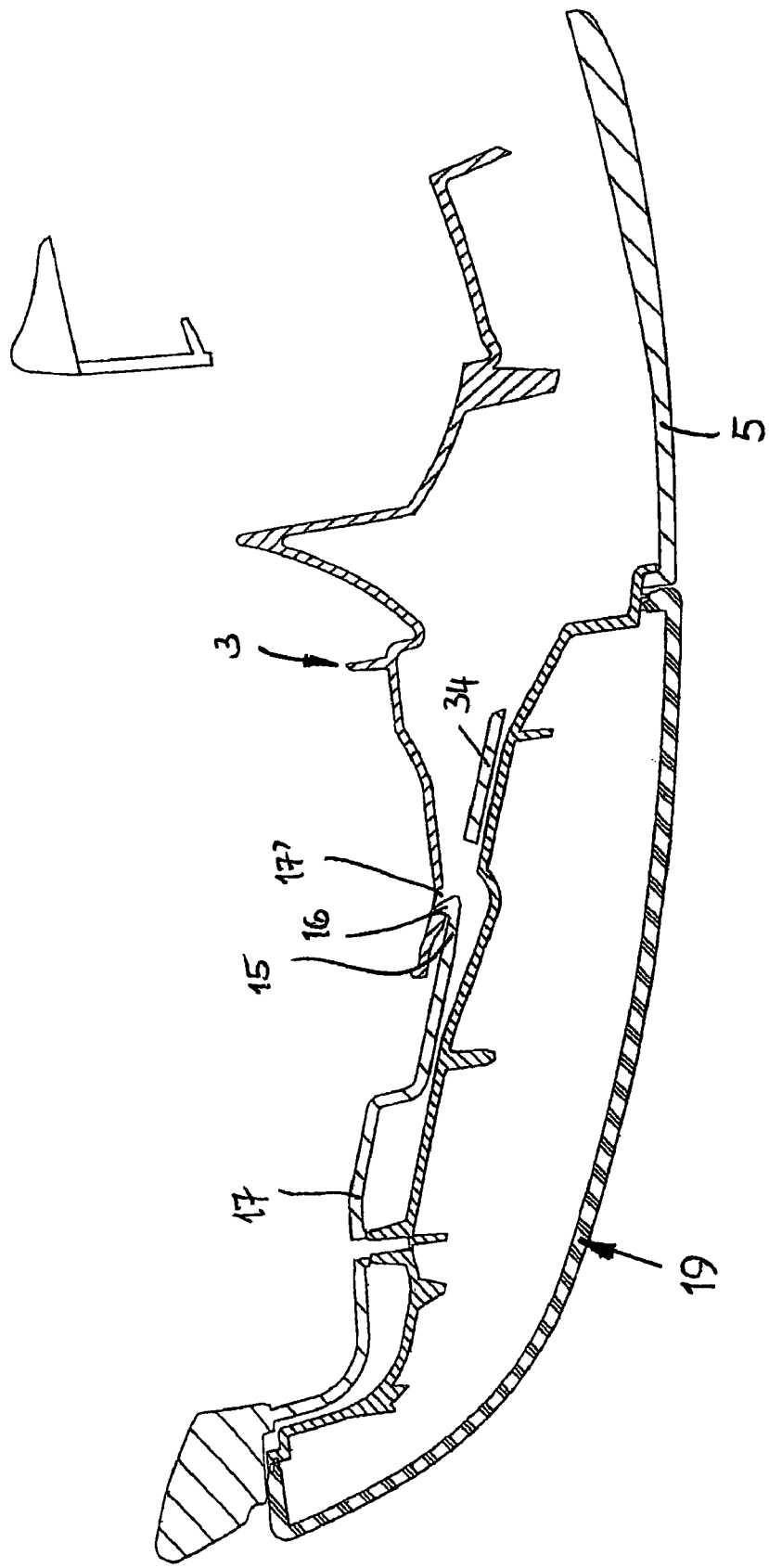
FIG. 8 is a representation according to FIG. 7 with a repeat flashing indicator light inserted into the outside rear view mirror.
Figure 9:
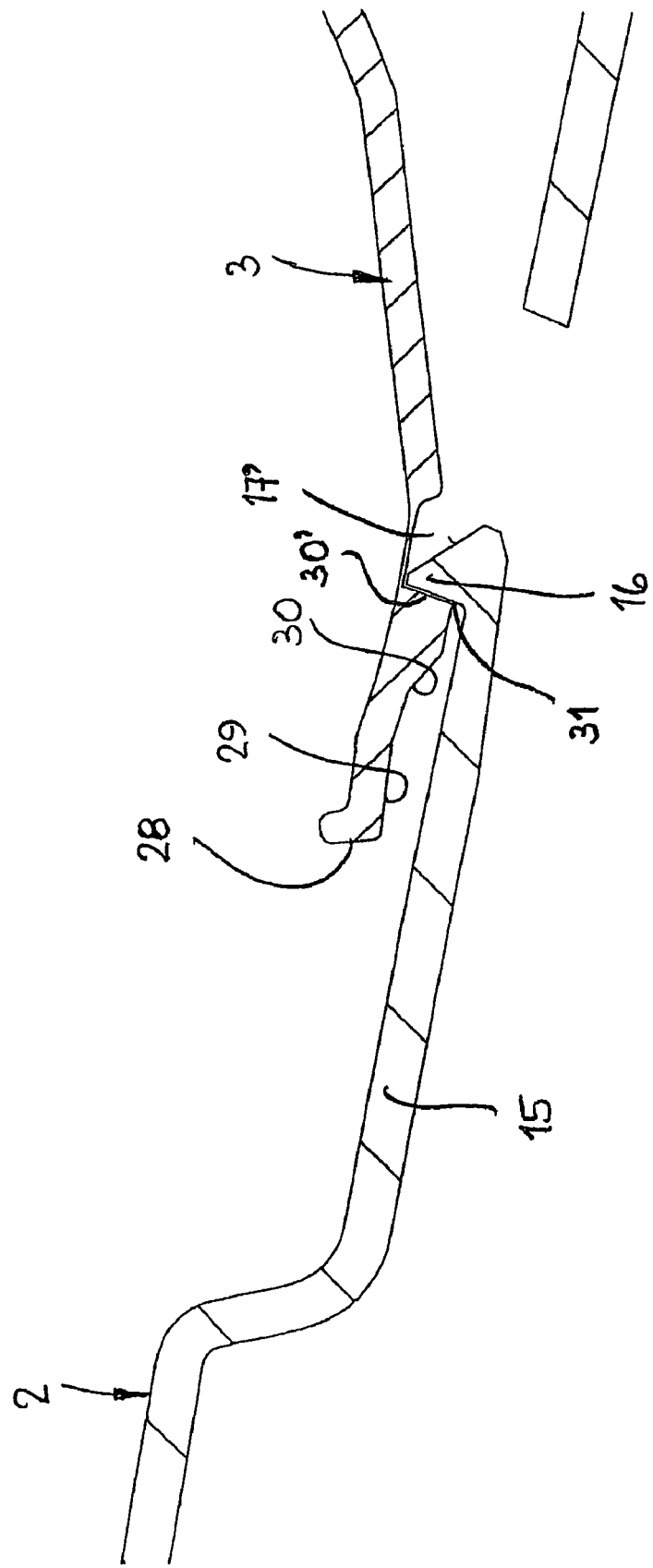
FIG. 9 is an enlarged representation of the locking area between the mirror mounting bracket and the mirror housing according to FIG. 7.

During assembly, the mirror mounting bracket 3 is inserted through the insertion opening 7 into the mirror housing 2 in such a manner that the positive locking components 13, 14 enter the insertion tunnels 11, 12 of the mirror housing 2. The bevels 22, 23 ensure that the two positive locking components 13, 14 reliably penetrate into the insertion tunnels 11, 12. The secure connection between the mirror housing 2 and the mirror mounting bracket 3 is achieved by means of the snap-in tongue 15. The mirror mounting bracket 3 defines a front edge 28 in the insertion direction, from which the two positive locking devices 13, 14 perpendicularly project (FIG. 2). Upon complete insertion of the mirror mounting bracket 3 into the mirror housing 2, the front edge 28 comes to rest over the snap-in tongue 15. Upon insertion of the mirror mounting bracket 3, the snap-in tongue 15 is elastically bent away until the catch piece 16 can catch into the catch opening 17' (FIG. 7). In order that this catch process may reliably occur, the mirror mounting bracket 3, as shown in FIG. 9, is provided with an increasingly sloped surface 30, in the direction of insertion on its underside 29 facing the snap-in tongue 15, upon which the catch piece 16 comes to bear. Due to the oblique position of this sloped surface 30, the snap-in tongue 15 is elastically pushed away during the insertion process until the catch piece 16 can catch in the catch recess 17'. In this position, the mirror housing 2 and the mirror mounting bracket 3 are securely connected to another without any hindrance. The positive locking components 13, 14 ensure in a simple and reliable manner that the mirror mounting bracket 3 arrives effortlessly into its exact position of installation.

Figure 4:
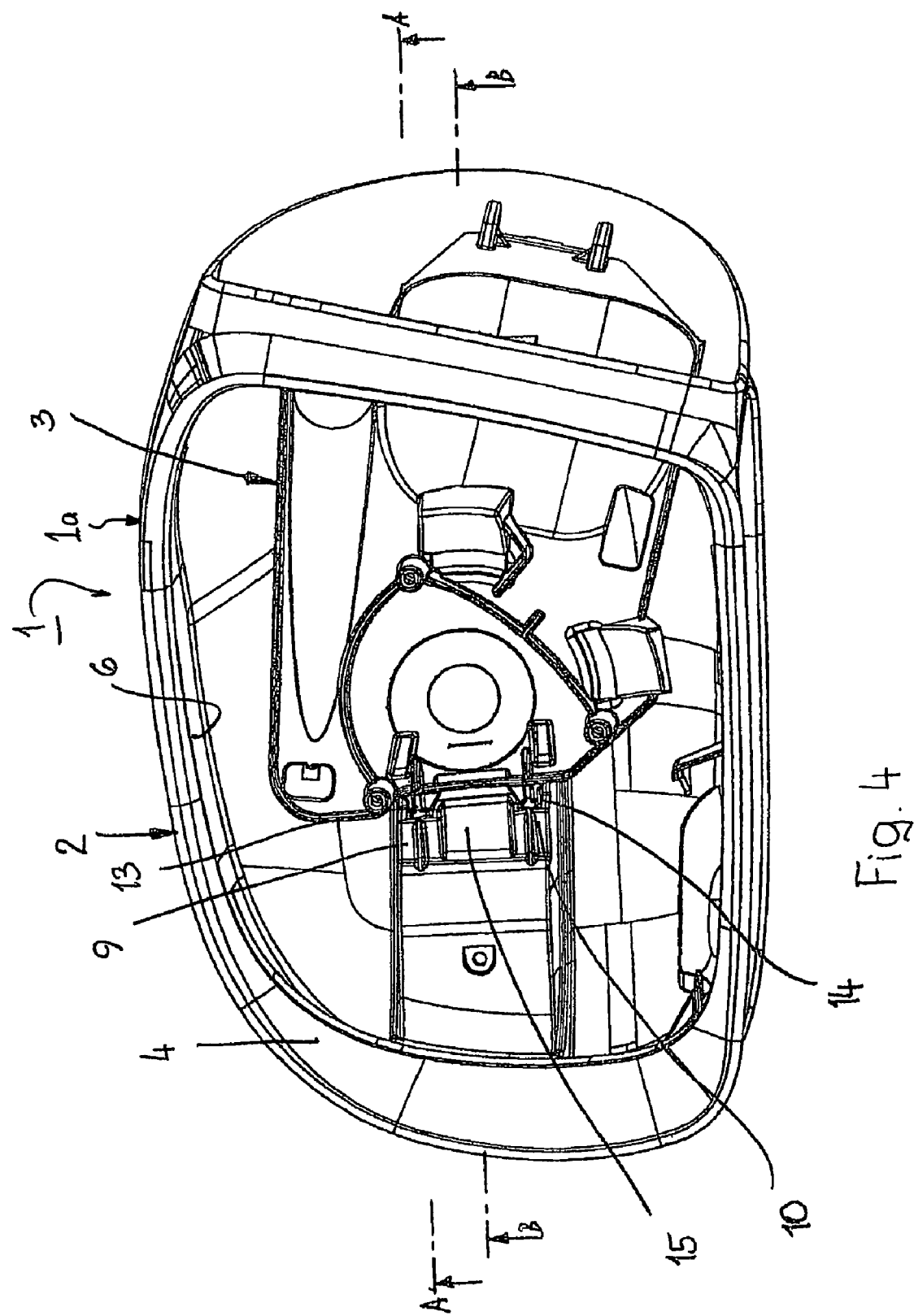
FIG. 4 is a front view of the mirror housing with the mirror mounting bracket locked therein.
Figure 5:
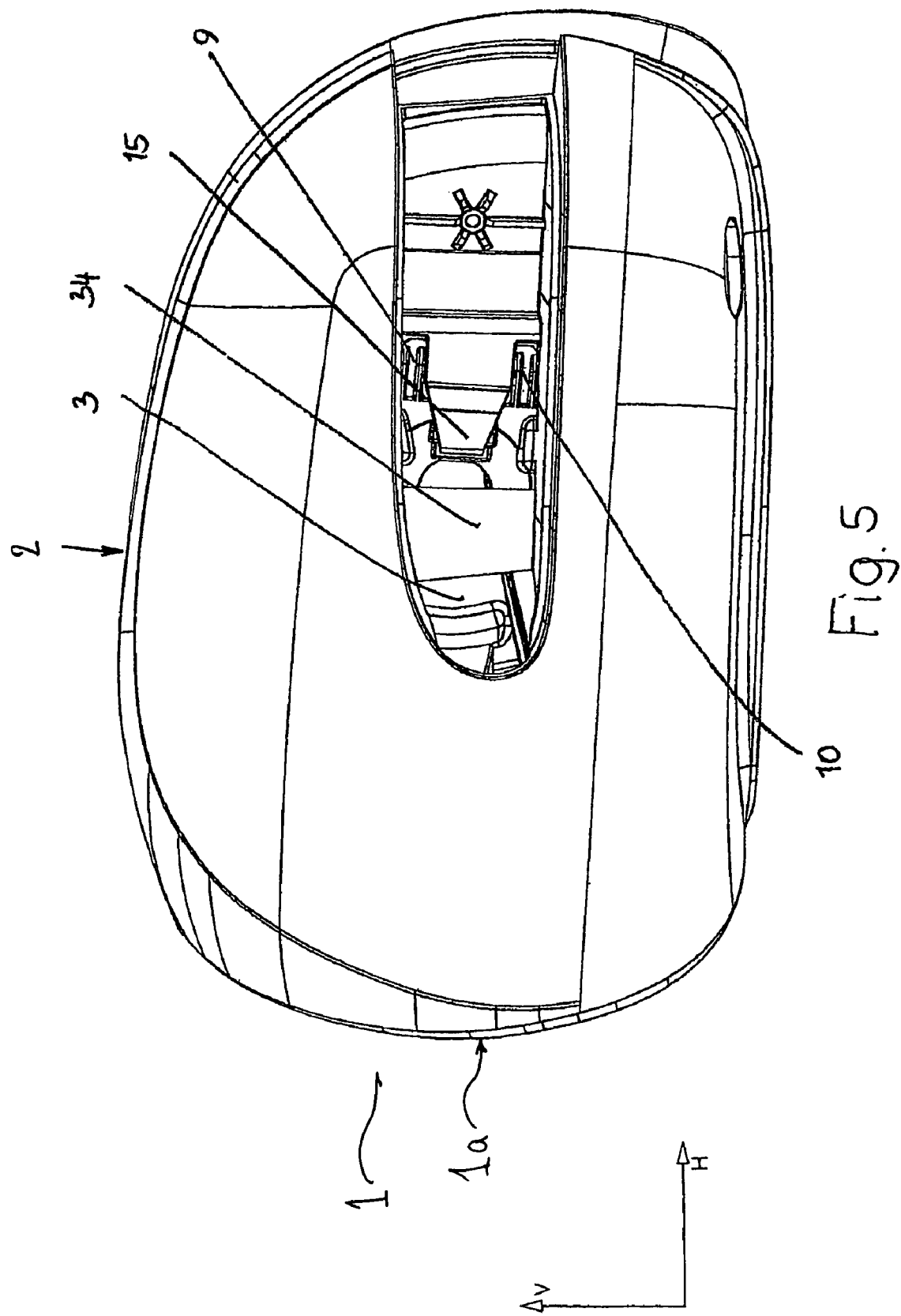
FIG. 5 is a rear view of the mirror housing with the mirror mounting bracket locked therein.

The mirror mounting bracket 3 can only be removed from the mirror housing 2 when the snap-in tongue 15 is elastically pushed down upon far enough so as to release the catch piece 16 from the catch recess 17'. Then, the mirror mounting bracket 3 can be pulled counter to the direction of insertion, out from the mirror housing 2. Access to the snap-in tongue 15 is only then possible when the mirror glass has been removed or pivoted to the side. Then the snap-in tongue 15 can be elastically bent away with the proper tool through the opening 6 (FIG. 4).

In the catch position, the snap-in tongue 15 advantageously lies against the mirror mounting bracket 3 under initial elastic tension so that the mirror housing 2 and the mirror mounting bracket 3 are connected to one another in the direction of insertion without any play.

The connection between the mirror housing 2 and the mirror mounting bracket 3 is achieved by the described design of the mirror housing 2 and of the mirror mounting bracket 3 in a simple manner. The mirror mounting bracket 3 and/or the mirror housing 2 are each advantageously comprised of a one-piece plastic component. The insertion process can therefore be realized simply and cost-effectively. Additional components such as shaped plate springs are not required. Based on the described design, very little space is required and a very flat mode of construction ensues. As a result of the described initial tension in the snap-in connection, secure interlocking results between the mirror housing 2 and the mirror mounting bracket 3. In order to achieve high vibration proofing of the mirror housing 2 and/or of the mirror mounting bracket 3, the positive lock components 13, 14 are preferably braced in the insertion tunnels 11, 12 of the profile sections 9, 10.

During the insertion procedure of the mirror mounting bracket 3 into the mirror housing 2, an angled surface 30' of the mirror mounting bracket 3 complements an angled surface 31 of the catch piece 16 (FIG. 9) ensure that a tolerance balance is achieved for the insertion procedure. The angled surface 30' delimits the catch recess 17' in the insertion direction of the mirror mounting bracket 3.

Adjoining the wall section 17 are more or less mutually parallel lying side walls 32, 33 (FIG. 1) that stand off from the back wall 5. The snap-in tongue 15 lies at a spacing distance between the side walls 32, 33 (FIG. 1). With a spacing distance from the free end of the snap-in tongue 15, the side walls 32, 33 are connected to a mutually integrated and advantageously designed one-piece crosspiece 34, which advantageously lies at the height of the upper edges of the side walls 32, 33 and which is configured at a distance from and above the back wall 5.

On the underside of the mirror mounting bracket 3, protrusions 35, 36 (FIG. 2) are provided and act together with the side walls 32, 33. During the insertion procedure, the protrusions 35, 36 arrive close to the wall section 17 on the upper edges of the side walls 32, 33. These regions of the side walls 32, 33 thus form butting cants.

The additional light 19 is secured in the receiving chamber 18 in a known manner. The additional light 19 includes a light pane 37 (FIG. 6) which, in the installed position, lies in the back wall 5 of the mirror housing 2 and is oriented toward the front in the travel direction of the motor vehicle. The additional light 19 is, for example, a repeat flashing indicator light which is designed in a known manner. The end of the additional light 19, which is opposite the mirror base plate, slightly stands over the outer side of the back wall 5.

Figure 12:
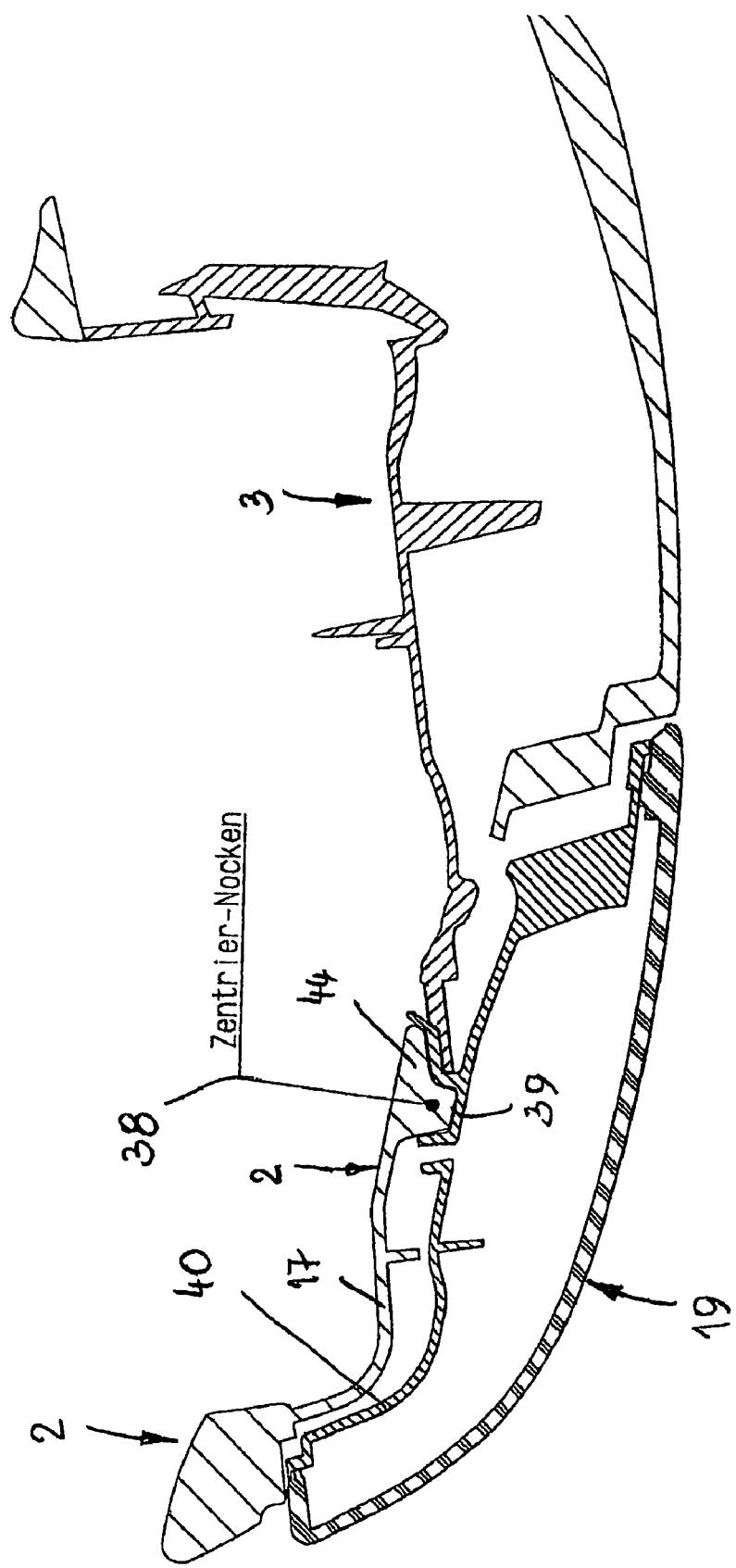
FIG. 12 is a cross-sectional view of a second form of embodiment of the mirror head of the outside rear view mirror in accordance with the invention.
Figure 13:
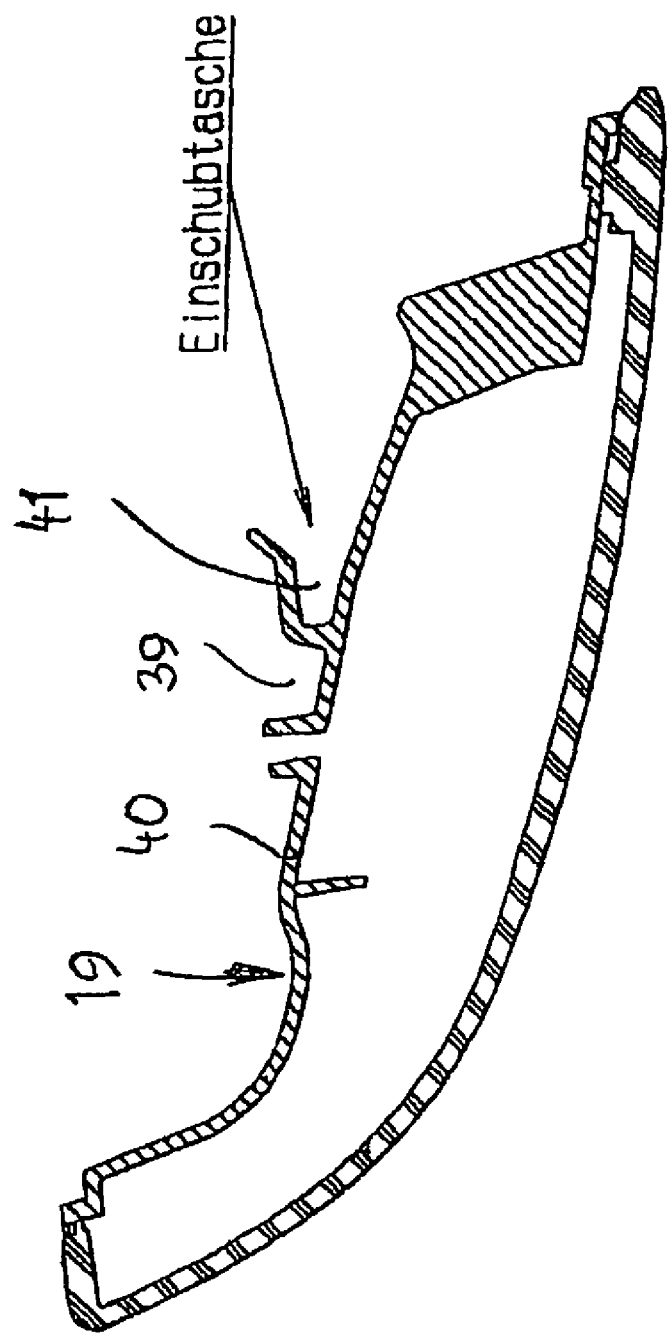
FIG. 13 is a cross-sectional view of the mirror head of the outside rear view mirror of FIG. 12 with a repeat flashing indicator light inserted therein.

In the form of embodiment according to FIGS. 12 through 14, the additional light 19 interlocks between the mirror housing 2 and the mirror mounting bracket 3. As the FIGS. 12 through 14 show, at the height of the profile sections 9, 10, the mirror housing 2 is provided with a protruding cam 38 which catches into a recess 39 of the housing 40 of the additional light 19. The cam 38 respectively lies behind one insertion pocket 41 into which the positive lock components 13, 14 of the mirror mounting bracket 3 interlock with a form fit. The positive lock components 13, 14 are both designed to have the same design as in the previous form of embodiment. The free space sectional area of the insertion pockets 41 tapers in the direction of insertion of the mirror mounting bracket 3, which is designed to correspond to that of the previous form of embodiment. In the installed position, the positive lock components 13, 14 lie on the upper face of the insertion pocket 41 (FIG. 14). Adjoining the insertion pocket 41 is an upward oriented edge 42 opposite the direction of insertion which provides for ensuring that upon insertion of the mirror mounting bracket 3, the positive lock components 13, 14 securely arrive into the insertion pockets 41. In the installed position, the positive lock components 13, 14 rest up against a sloped surface 43 at the upward oriented edge 42. The sloped surfaces 43 of the positive lock components 12, 13 thus form stop faces by which the depth of insertion of the positive lock components 13, 14 into the insertion pockets 41 is determined.

Upon assembly, the mirror mounting bracket 3 with its positive lock components 13, 14 is inserted into the insertion pockets 41 of the additional light. At the same time, the snap-in tongue 15 catches into the catch recess 17' (FIG. 9) of the mirror mounting bracket 3 as described based on the previous form of embodiment. In this manner, the mirror housing 2 and the mirror mounting bracket 3 are safely connected to one another without risk of loss. Furthermore, the mirror housing 2 is interlocked by the cam 38 in the catch recess 39 of the housing 40 of the additional light 19. In this manner, the mirror housing 2 and the additional light 19 are form fittingly joined together. Based on this form-fit, the additional light 19 can no longer be pulled out from the outside rear view mirror so that the mirror housing 2 and the additional light 19 are joined together securely without risk of being lost.

In the represented and described form of embodiment, the housing 40 of the additional light 19 has two recesses 39 into which respectively one cam 38 of the mirror housing 2 catches. For a loss-proof union between the mirror housing 2 and the additional light 19, a single cam 38 also suffices and accordingly, a single catch recess 39 as well.

With an edge area 44, the wall section 17 of the mirror housing 2 overlaps the insertion pocket 41, which rests against the underside 45 of the edge area 44 (FIG. 14). The underside 45 transitions over into the generated surface of the cam 38. Thus a stop is formed for the insertion pocket 41 on the wall section 17 of the mirror housing 2.

The mirror head 1a can be comprised of additional elements in the mirror housing 2 such as, at the least, a surround light to illuminate the ground area next to the vehicle, an antenna, a heating device for the mirror glass, a step motor to adjust the mirror glass, at least a loudspeaker, components of a garage door opener, such as a transmitter, a global positioning system (GPS) module and such similar. Additional components can even be housed in the mirror mounting bracket on which the mirror head is guided, such as, at least, a surround light, a repeat flashing indicator light, switching devices for controlling elements housed in the mirror head and such similar.

The invention has been described in an illustrative manner. It is to be understood that the terminology, which has been used, is intended to be in the nature of words of description rather than of limitation.

Many modifications and variations of the invention are possible in light of the above teachings. Therefore, within the scope of the appended claims, the invention may be practiced other than as specifically described.

The invention claimed is:

1. An outside rear view mirror assembly (1) for a motor vehicle, said outside rear view mirror assembly (1) comprising:
   a mirror housing (2) including a circumferential lateral wall (4) defining an opening (6), an insertion opening (7), and a back wall (5);
   a mirror mounting bracket (3) fixedly securable to the motor vehicle and insertable into said mirror housing (2) through said insertion opening (7), said mirror mounting bracket (3) including a catch recess (17'); and
   a snap-in tongue (15) defining a free end and extending out from said back wall (5) within said minor housing (2) for positive locking engagement with said catch recess (12') of said mirror mounting bracket (3) when said mirror mounting bracket (3) is inserted into said mirror housing (2) to lock said mirror mounting bracket (3) therein such that said mirror housing (2) is fixedly secured to the motor vehicle.

2. An outside rear view mirror assembly (1) as set forth in claim 1 wherein said snap-in tongue (15) includes a catch piece (16) at said free end thereof to engage said catch recess (17').

3. An outside rear view mirror assembly (1) as set forth in claim 2 wherein said mirror mounting bracket (3) includes a positive locking component (13) extending out from said mirror mounting bracket (3) to guide said mirror mounting bracket (3) as it is inserted into said mirror housing (2).

4. An outside rear view mirror assembly (1) as set forth in claim 3 wherein said back wall (5) of said mirror housing (2) includes an insertion tunnel (11) for receiving said positive locking component therein.

5. An outside rear view mirror assembly (1) as set forth in claim 4 wherein said positive locking component (13) includes a stop (24) for abutting said insertion tunnel (11) preventing said catch piece (16) from moving past said catch recess (17').

6. An outside rear view minor assembly (1) as set forth in claim 5 wherein said catch recess (17') includes an angled surface (31) to abut and engage said catch piece (16).

7. An outside rear view mirror assembly (1) as set forth in claim 2 wherein said catch piece (16) extends laterally across said snap-in tongue (15).

* * * * *